United States Patent
Smith

(10) Patent No.: US 10,096,392 B2
(45) Date of Patent: Oct. 9, 2018

(54) ION EXCHANGE COLUMN CONFIGURED TO REDUCE INTERNAL LEVELS OF RADIOLYTIC HYDROGEN GAS

(71) Applicant: P&T Global Solutions, LLC, Salt Lake City, UT (US)

(72) Inventor: Eric Smith, Columbia, MD (US)

(73) Assignee: P&T Global Solutions, LLC, Salt Lake City, UT (US)

( * ) Notice: Subject to any disclaimer, the term of this patent is extended or adjusted under 35 U.S.C. 154(b) by 288 days.

(21) Appl. No.: 14/937,570

(22) Filed: Nov. 10, 2015

(65) Prior Publication Data

US 2017/0047136 A1 Feb. 16, 2017

Related U.S. Application Data

(60) Provisional application No. 62/204,791, filed on Aug. 13, 2015.

(51) Int. Cl.
*G21F 9/12* (2006.01)
*G21F 5/06* (2006.01)
(Continued)

(52) U.S. Cl.
CPC ............. *G21F 9/12* (2013.01); *B01D 15/08* (2013.01); *B01J 20/06* (2013.01); *B01J 20/22* (2013.01);
(Continued)

(58) Field of Classification Search
CPC ... G21F 5/005; G21F 5/06; G21F 9/12; G21C 9/06; G21C 19/317; B01J 47/00;
(Continued)

(56) References Cited

U.S. PATENT DOCUMENTS 3,893,870 A 7/1975 Kozawa
4,407,774 A * 10/1983 Schretzmann ......... G21C 9/001
376/279

(Continued)

FOREIGN PATENT DOCUMENTS

WO WO 2013085644 A1 * 6/2013 ............... G21F 9/06

OTHER PUBLICATIONS

Nigrey, An Issue Paper on the Use of Hydrogen Getters in Transportation Packaging, Feb. 2000, Sandia Report No. SAND2000-0483, 43 pages [online], [retrieved on Oct. 19, 2017]. [Retrieved from the internet: <http://www.iaea.org/inis/collection/NCLCollectionStore/_Public/31/048/31048058.pdf>.*

(Continued)

*Primary Examiner* — Matthew O Savage
(74) *Attorney, Agent, or Firm* — Holland & Hart, LLP

(57) ABSTRACT

An ion exchange system includes one or more strategies to reduce the amount of hydrogen gas inside an ion exchange column when the column is offline or disposed of. The ion exchange system comprises an ion exchange column including a housing and ion exchange media positioned in the housing. The ion exchange column can include one or more of the following: (1) an oxide material that limits the production of hydrogen gas from radiolysis, (2) a hydrogen scavenging material that removes or scavenges hydrogen gas inside the column, and (3) a hydrogen catalytic material that catalyzes the reaction of hydrogen and oxygen inside the column.

19 Claims, 1 Drawing Sheet

(51) Int. Cl.
| | |
|---|---|
| B01J 20/22 | (2006.01) |
| B01D 15/08 | (2006.01) |
| B01J 39/14 | (2006.01) |
| B01J 39/18 | (2017.01) |
| B01J 41/10 | (2006.01) |
| B01J 41/12 | (2017.01) |
| B01J 43/00 | (2006.01) |
| B01J 47/02 | (2017.01) |
| G21C 9/06 | (2006.01) |
| G21C 19/317 | (2006.01) |
| B01J 20/28 | (2006.01) |
| B01J 20/06 | (2006.01) |
| B01J 39/09 | (2017.01) |
| B01J 47/016 | (2017.01) |

(52) U.S. Cl.
CPC ......... *B01J 20/28052* (2013.01); *B01J 39/09* (2017.01); *B01J 39/14* (2013.01); *B01J 39/18* (2013.01); *B01J 41/10* (2013.01); *B01J 41/12* (2013.01); *B01J 43/00* (2013.01); *B01J 47/016* (2017.01); *B01J 47/02* (2013.01); *G21C 9/06* (2013.01); *G21C 19/317* (2013.01); *G21F 5/06* (2013.01); *Y02E 30/40* (2013.01)

(58) Field of Classification Search
CPC ......... B01J 47/02; B01J 47/022; B01D 15/08; B01D 35/14; A62C 3/00; C02F 1/42; C02F 2101/006
See application file for complete search history.

(56) References Cited

U.S. PATENT DOCUMENTS

| | | | | |
|---|---|---|---|---|
| 5,169,566 | A * | 12/1992 | Stucky | B28B 1/00 |
| | | | | 264/255 |
| 5,888,925 | A | 3/1999 | Smith et al. | |
| 6,063,307 | A | 5/2000 | Shepodd et al. | |
| 6,524,534 | B1 * | 2/2003 | Tahara | G21C 9/06 |
| | | | | 376/277 |
| 2008/0272333 | A1 | 11/2008 | Blanco-Garcia et al. | |
| 2010/0104483 | A1 | 4/2010 | Abadie et al. | |
| 2012/0024197 | A1 * | 2/2012 | Lambertin | B01J 20/0222 |
| | | | | 106/694 |
| 2013/0178686 | A1 * | 7/2013 | Lefebvre | G21F 9/02 |
| | | | | 588/20 |

OTHER PUBLICATIONS

International Search Report and Written Opinion, PCT/US2016/037269, dated Oct. 13, 2016 (17 pp.).

Ge, Q., et al., Influence of Pd Ion-Exchange Temperature on the Catalytic Performance of Cu-ZnO/Pd-β Zeolite Hybrid Catalyst for CO Hydrogenation of Light Hydrocarbons, Catalysis Communications, vol. 9, pp. 1775-1778, Feb. 21, 2008 (4 pp.).

Phienluphon, R., et al., Designing Core $(Cu/ZnO/Al_2O_3)$-Shell (SAPO-11) Zeolite Capsule Catalyst with a Facile Physical Way for Dimethyl Ether Direct Synthesis From Syngas, Chemical Engineering Journal, vol. 270, pp. 605-611, Feb. 23, 2015 (7 pp.).

Pinkaewa, K., et al., A New Core-Shell-Like Capsule Catalyst With SAPO-46 Zeolite Shell Encapsulated Cr/ZnO for the Controlled Tandem Synthesis of Dimethyl Ether From Syngas, Fuel, vol. 111, pp. 727-732, Apr. 6, 2013 (6 pp.).

Yang, G., et al., A New Method of Ethanol Synthesis From Dimethyl Ether and Syngas in a Sequential Dual Bed Reactor With the Modified Zeolite and Cu/ZnO Catalysts, Catalysis Today, vol. 6, pp. 425-428, Oct. 14, 2010 (4 pp.).

Anderson, B.L., et al., Hydrogen Generation in TRU Waste Transportation Packages, Lawrence Livermore National Laboratory, May 2000 (123 pp.).

Bibler, N.E., et al., Measurement of Prediction of Radiolytic Hydrogen Production in Defense Waste Processing Slurries at Savannah River Site, WM'07 Conference, 2007 (15 pp.).

Blanchat, T., et al., Analysis of Hydrogen Depletion Using a Scaled Passive Autocatalytic Recombiner, Sandia National Laboratories, Albuquerque, New Mexico, Oct. 28, 1998 (24 pp.).

Caer, Sophie Le, Water Radiolysis: Influence of Oxide Surfaces in $H_2$ Production under Ionizing Radiation, Open Access, Water 2011, 3, pp. 235-253, Feb. 28, 2011 (19 pp.).

Dinh, L., et al., Hydrogen Uptake of DPB Getter Pellets, LLNL-JRNL-405152, Lawrence Livermore National Laboratories, Jul. 8, 2008 (51 pp.).

Hu, Lin-Wen, Radiolysis Calculations and Hydrogen Peroxide Measurements for the MIT BWR Coolant Chemistry Loop, Massachusetts Institue of Technology, May 7, 1993 (230 pp.).

Kasten, J.L, A Literature Review of Radiolytic Gas Generation as a Result of the decomposition of Sodium Nitrate Wastes, Oak Ridge National Laboratory, 1991 (31 pp.).

Kelm, S., et al., Operational Behaviour of Catalytic Recombiners—Experimental Results and Modelling Approaches, Institute for Energy Research Safety Research and Reactor Technology. Jülich, Germany, PDF file creation date 2008 (11 pp.).

Koroll, G., et al., Catalytic Hydrogen Recombination for Nuclear Containments, AECL Research Whiteshell Laboratories, Pinawa, Manitoba, Canada, 1995 (18 pp.).

Livingston, R., et al., Enhanced Polymer Hydrogen Getters for Use in the TRUPACT-II, SAND2002-8267, Sandia National Laboratories, Albuquerque, New Mexico, Jun. 2002 (101 pp.).

Lloyd, J.A., et al., Literature Search on Hydrogen/Oxygen Recombination and Generation in Plutonium Storage Environments, Los Alamos National Laboratory, 1998 (25 pp.).

Stone, Mark, et al., Improved Hydrogen Gas Getters for TRU Waste—Final Report, Idaho National Laboratory, Idaho Falls, ID, Sep. 2005 (83 pp.).

* cited by examiner

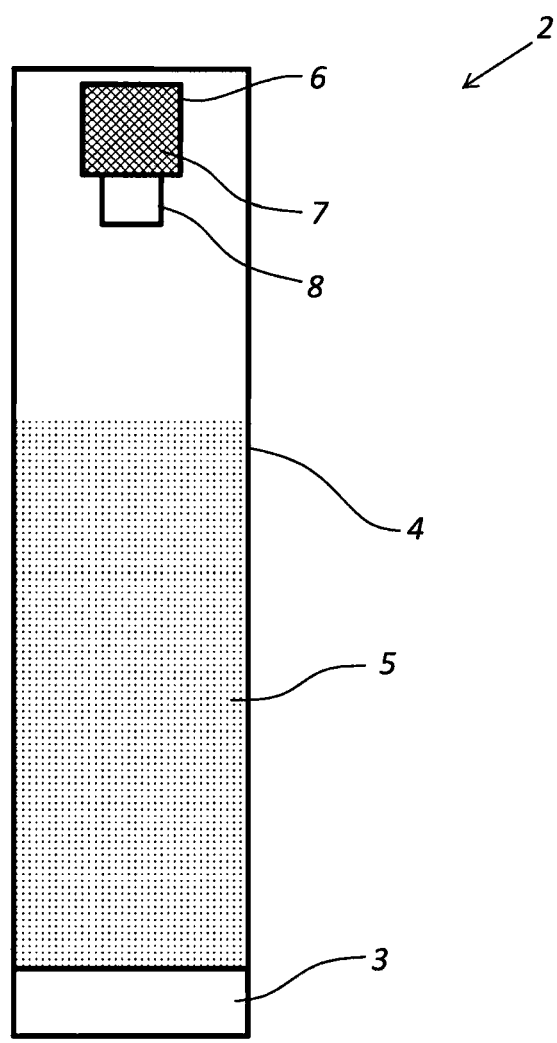

ION EXCHANGE COLUMN CONFIGURED TO REDUCE INTERNAL LEVELS OF RADIOLYTIC HYDROGEN GAS

CROSS-REFERENCE TO RELATED PATENT APPLICATIONS

This claims the benefit of U.S. Provisional Patent App. No. 62/204,791, titled "System and Method for Controlling Gas Space Hydrogen Concentration in Ion Exchange Columns Used to Remove Radionuclides from Liquids," filed on 13 Aug. 2015, the entire contents of which are incorporated by reference into this document. In the event of a conflict, the subject matter explicitly recited or shown in this document controls over any subject matter incorporated by reference. The incorporated subject matter should not be used to limit or narrow the scope of the explicitly recited or depicted subject matter.

BACKGROUND

Radioactive waste is generated by the operation of nuclear reactors, processing used nuclear fuel, the operation of particle accelerators, and other sources. A portion of this waste is in the form of a liquid stream that contains radioactive contaminants. The liquid waste must be processed to render it safe for disposal through solidification, radionuclide removal, and/or other methods.

Ion exchange is a common method used to treat liquid radioactive waste containing significant amounts of radionuclides. The ion exchange process involves moving the liquid waste stream through an ion exchange column filled with ion exchange media. The radionuclides in the liquid are absorbed by the ion exchange media and separated from the remaining liquid.

The amount of radionuclides absorbed by the ion exchange media increases as the process proceeds. The buildup of radiation emitting nuclides in the ion exchange media is significant and can produce dangerous radiation fields around the ion exchange column. In some situations, the ion exchange columns are enclosed in or surrounded by radiation shielding material to lower radiation levels and protect workers.

When the ion exchange media is loaded at or near its capacity, the ion exchange column is removed from service. The liquid waste stream no long flows through the column. In this state, the high radiation fields emitted from the radionuclides absorbed on the ion exchange media breakdown a fraction of the water contained in the ion exchange column through the process of radiolysis.

In radiolysis, the water molecules are split by the radiation and through a series of reactions form gaseous hydrogen and oxygen. The radiation can be in the form of alpha particles, beta particles, or gamma rays from radioactive isotope decay. The gases collect at the top of the ion exchange column and increase in concentration until they form a potentially flammable and/or explosive mixture.

The flammable/explosive gas mixture represents a significant hazard. It could ignite, damage the ion exchange column and ifs shielding, and spread the highly radioactive ion exchange media leading to potentially lethal radiation exposure to people in the vicinity.

Conventionally, this problem is addressed in one of two ways. The first is to connect the ion exchange column to a safety credited system that actively purges the hydrogen gas from the column. The second is to dry the ion exchange column to remove the water that is the source of the hydrogen. These systems must operate continuously to prevent the uncontrolled buildup of hydrogen. This makes them expensive to install and maintain because they require redundant systems with backup power supplies.

SUMMARY

An ion exchange system is configured to prevent the buildup of radiolytic hydrogen gas inside an ion exchange column. The ion exchange column is used to separate radionuclides from a liquid waste stream. When the column is removed from service, the radionuclides captured in the ion exchange media emit radiation that causes radiolytic splitting of water, which produces hydrogen gas. The accumulation of hydrogen gas in the column can be reduced using any one or more of the following methods.

In some embodiments, the ion exchange column includes one or more hydrogen scavenging materials or hydrogen getters that are capable of removing the hydrogen gas inside the column. The hydrogen scavenging material can irreversibly remove the hydrogen gas by absorbing and/or adsorbing it as well as chemically and/or physically bonding with it.

The hydrogen scavenging material can be positioned at any location inside the ion exchange column. Preferably, the hydrogen scavenging material is positioned at or near the top of the column because that is where the hydrogen gas accumulates.

In some embodiments, the ion exchange media is positioned in a first chamber and the hydrogen scavenging material is positioned in a second chamber. The second chamber is sealed shut when the ion exchange column is in service to prevent the liquid waste stream from mixing with the hydrogen scavenging material. The second chamber is opened when the column is removed from service and drained to allow the hydrogen scavenging material to interact with and bind the hydrogen gas.

In some embodiments, the ion exchange column includes one or more hydrogen catalytic materials that catalyze the recombination of hydrogen gas and oxygen gas inside the column. The hydrogen catalytic material can be positioned at any location inside the ion exchange column. For example, the hydrogen catalytic material can be positioned in the same locations as the hydrogen scavenging material.

In some embodiments, the ion exchange media is positioned in a first chamber and the hydrogen catalytic material is positioned in a second chamber. The second chamber is sealed shut when the ion exchange column is in service to prevent the liquid waste stream from mixing with the hydrogen catalytic material. The second chamber is opened when the column is removed from service and drained to allow the hydrogen catalytic material to interact with and bind the hydrogen gas.

In some embodiments, the ion exchange column includes both the hydrogen scavenging material and the hydrogen catalytic material. For example, the second chamber can include both the hydrogen scavenging material and the hydrogen catalytic material. Alternatively, the ion exchange column can include a separate sealed chamber for each one of the hydrogen scavenging material and the hydrogen catalytic material. In this embodiment, the ion exchange column includes a first chamber for the ion exchange media, a second chamber for the hydrogen scavenging material, and a third chamber for the hydrogen catalytic material.

In some embodiments, the ion exchange column includes one or more oxide materials that limit the generation of hydrogen from radiolysis. The oxide material can be included in the ion exchange column in any suitable manner.

In some embodiments, the oxide material is mixed with the ion exchange media in the first chamber.

In some embodiments, the oxide material has a low radiolytic yield for hydrogen. For example, the oxide material has a G-value for hydrogen from alpha radiolysis that is no more than 1.6. Alternatively, the oxide material has a G-value for hydrogen from beta and gamma radiolysis that is no more than 0.45.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which:

FIG. 1 is a diagram of one embodiment of an ion exchange system including an ion exchange column configured to reduce internal levels of radiolytic hydrogen gas.

DETAILED DESCRIPTION

Referring to FIG. 1, an ion exchange system 2 includes an ion exchange column 3 having a housing 4 and ion exchange media 5 positioned inside the housing 4. The ion exchange system 2 can be used to remove or separate contaminants from any liquid waste stream but it is especially useful for removing radionuclides from liquid radioactive waste streams.

The ion exchange system 2 is configured to reduce the amount of hydrogen gas that accumulates inside the housing 4 when the ion exchange column 3 is taken offline temporarily or permanently. This is accomplished using one or a combination of the various methods described below. The methods can be used to reduce any hydrogen gas accumulation in the ion exchange column 3 but are especially useful in situations where the hydrogen gas is produced by hydrolysis. Also, unlike conventional methods for addressing hydrogen gas accumulation, these methods are intrinsically safe and economical.

In general, the ion exchange system 2 facilitates the exchange of ions between an electrolyte solution (the liquid waste stream) and an ion containing media (the ion exchange media 5). As the liquid waste flows over and through the ion exchange media 5, ions in the liquid are exchanged with ions in the media 5. An example of a common ion exchange system is a water softener where calcium ions in the water are exchanged with sodium ions in the media.

The ion exchange system 2 can remove any of a number of contaminants from the liquid waste stream. In one embodiment, the ion exchange system 2 removes radionuclides such as Cs-137 from the liquid waste stream. It should be appreciated that the ion exchange system 2 can remove other radionuclides as well.

The ion exchange column 3 is a vessel designed to contain the pressure of the flowing liquid waste and the ion exchange media 5. The ion exchange column 3 includes one or more inlets through which the liquid waste flows into the column 3 from corresponding piping and one or more outlets through which the treated liquid waste flows out of the column 3. The ion exchange column 3 can also include one or more internal components that distribute the liquid waste to provide even flow distribution over the ion exchange media 5 and to evenly collect the treated water after it has passed over the media 5.

The ion exchange column 3 can include screens, filters, and/or other devices at the inlet and outlet to prevent the ion exchange media 5 from becoming entrained in the liquid waste and exiting the column 3. It can also include other connections through which the ion exchange media 5 can be flushed and/or or removed. Numerous other connections can also be provided to monitor and/or control the performance of the ion exchange column 3.

The ion exchange column 3 can be any suitable column having any suitable configuration. In on embodiment, the ion exchange column 3 is configured to remove radionuclides from a liquid radioactive waste stream. The ion exchange column 3 can also be made of any suitable material. In one embodiment, the ion exchange column 3 is made of metal such as carbon steel, stainless steel, and/or various alloys of carbon steel, stainless steel, and the like.

The ion exchange media 5 can be any suitable material. In one embodiment, the ion exchange media 5 includes solid polymeric and/or mineral-based ion exchange material. Examples of suitable ion exchange media 5 include resins (functionalized porous or gel polymer), zeolites, montmorillonite, clay, soil humus, and the like.

In some embodiments, the ion exchange media 5 is a cation exchanger that exchanges positively charged ions (cations). In another embodiment, the ion exchange media 5 is an anion exchanger that exchanges negatively charged ions (anions). In yet another embodiment, the ion exchange media 5 is an amphoteric exchanger capable of exchanging both cations and anions simultaneously.

In some embodiments, the ion exchange system 2 includes radiation shielding that surrounds and/or encloses the ion exchange column 3. The radiation shielding is provided to reduce the intensity of the radiation emitted from the ion exchange column 3. The radiation shielding can be sized to create a gap between the shielding and the ion exchange column 3 on all side, the top, and the bottom. The gap can be filled with a fluid such as a gas like air, nitrogen, etc. The radiation shielding can be any suitable material such as concrete, cement, heavy metals, and the like. It should be appreciated that in other embodiments the ion exchange system 2 can be operated without radiation shielding.

The ion exchange system 2 can reduce internal hydrogen gas levels using a variety of techniques. For example, in some embodiments, one or more hydrogen scavenging materials can be positioned inside the housing 4 to remove the hydrogen gas. In other embodiments, one or more hydrogen catalytic materials can be positioned in inside the housing 4 to catalyze the recombination of hydrogen gas and oxygen gas to water. In other embodiments, an oxide material is positioned inside the housing 4 that reduces the amount of hydrogen generated through radiolysis. In still other embodiments, one or more of these techniques can be used together. Each technique is described in greater detail as follows.

The hydrogen scavenging material and the hydrogen catalytic material both operate to reduce hydrogen gas after it has formed. The hydrogen scavenging material reduces hydrogen gas by absorbing and/or adsorbing and/or by chemically and/or physically bonding to it. The hydrogen catalytic material reduces hydrogen gas by catalyzing the reaction of it and oxygen gas to form water.

The hydrogen scavenging material and/or the hydrogen catalytic material can be included in the housing 4 in any suitable manner. Preferably, these materials are positioned in a separate chamber from the ion exchange media 5 during normal operation of the ion exchange system 2. When the system is offline, the chamber is opened so it is in fluid communication with the ion exchange media 5 and can remove hydrolytic hydrogen gas.

In some embodiments, the ion exchange media 5 is positioned in a first chamber in the housing 4 and the hydrogen scavenging material and/or the hydrogen catalytic material are positioned in a second chamber, or in separate chambers—e.g., a second chamber for the hydrogen scavenging material and a third chamber for the hydrogen catalytic material. The second and/or third chambers are sealed relative to the first chamber during normal operation of the ion exchange column 3 and opened when it is moved offline.

Referring to FIG. 1, in some embodiments, the ion exchange column 3 includes an enclosure 6 positioned inside the housing 4 that contains the hydrogen scavenging material and/or hydrogen catalytic material. The hydrogen scavenging material and/or hydrogen catalytic material are represented by the reference numeral 7. It should be appreciated that the enclosure can include only hydrogen scavenging material, only hydrogen catalytic material, or a combination of the two. In other embodiments, multiple enclosures 6 can be included in the housing 4 containing hydrogen scavenging material and/or hydrogen catalytic material.

It should be appreciated that the enclosure 6 can be positioned in any suitable location in the housing 4. In one embodiment, the enclosure 6 is positioned at or near the top of the interior of the housing 4. Hydrogen gas is very light and tends to accumulate at the top of the housing 4.

In some embodiments, the enclosure 6 is isolated from the first chamber containing the ion exchange media 5 by a sealing device 8 (alternatively referred to as a door, valve, or isolation device). The sealing device 8 moves between a closed position where the chamber containing the ion exchange media 5 is not in fluid communication with the interior of the enclosure 6 and an open position where it is. The sealing device 8 can be any suitable device capable of selectively sealing the enclosure 6 closed.

In some embodiments, the sealing device 8 can be activated remotely. For example, in one embodiment, a motor can be activated remotely to move the sealing device 8 between the closed position and the open position. The motor can be positioned inside the housing 4 in a sealed enclosure or it can be outside the housing 4. If it is outside the housing 4, it can be coupled to the sealing device 8 using a shaft that extends through the housing 4. In other embodiments, the sealing device 8 can be manually activated. Numerous configurations are possible.

The enclosure 6 can be configured to prevent the material inside from falling out when the sealing device 8 is opened. For example, the material can be held in place by a screen or other perforated surface or barrier that prevents the material from falling out while still allowing the hydrogen gas to flow in. In another design, the geometry of the enclosure 6 can be configured so that the hydrogen gas must first move upward through a passage and then downward to reach the material. This shape of the pathway prevents the material from falling out.

The enclosure 6 and the sealing device 8 can be formed of any suitable material capable of withstanding the conditions inside the ion exchange column 3. In one embodiment, the enclosure 6 and/or the sealing device 8 can be made of metal, plastic, or composites. In some embodiments, these components are made of the same material that the housing 4 is made of—e.g., steel such stainless steel, carbon steel, or the like.

It should be appreciated that the hydrogen scavenging material can be any suitable material that is capable of removing hydrogen gas from the interior of the ion exchange column 3 in the manner described above—i.e., absorption, adsorption, chemical bonding, and/or physical bonding. In some embodiments, the hydrogen scavenging material is a solid. One example of a suitable material is 1,4-bis(phenylethynyl)benzene (commonly called DEB).

It should also be appreciated that the hydrogen catalytic material can also be any suitable material that is capable of catalyzing the reaction of hydrogen gas and oxygen to form water. One example of a suitable material is PdO.

In some embodiments, the ion exchange column 3 includes one or more oxide materials that limit the generation of hydrogen from radiolysis. The formation of hydrogen from radiolysis is a complex chain of chemical reactions that culminate in the release of hydrogen gas ($H_2$). Certain materials disrupt the chain of reactions and prevent hydrogen gas from forming. This reduces the amount of hydrogen gas that collects in the ion exchange column 3 and, thus, limits the flammability/explosive potential of the column.

In general, the oxide material has a low radiolytic yield for hydrogen. The radiolytic yield is the number of a given species (ion, radical, molecules, and so forth) decomposed, formed, or reacted per a given amount of energy. A common measure of the radiolytic yield is the G-value, which is the radiolytic yield per 100 eV of absorbed energy. The G-value for hydrogen ($G_{H2}$) is the number of $H_2$ molecules produced per 100 eV of absorbed energy.

The G-value varies depending on the type of radiation—i.e., alpha, beta, or gamma radiation. The G-value for hydrogen from alpha radiolysis of pure water is 1.6. The G-value for hydrogen from beta and gamma radiolysis of pure water is 0.45. The G-values are different because the spatial distributions of the $H_2$ precursors are different for alpha and beta/gamma radiation.

In some embodiments, the oxide material has a G-value for hydrogen from alpha radiolysis that is less than that of pure water—i.e., less than 1.6. In some other embodiments, the one or more oxide materials have a G-value for hydrogen from alpha radiolysis that is no more than approximately 1.5, no more than approximately 1.4, no more than approximately 1.3, no more than approximately 1.2, or no more than approximately 1. In some other embodiments, the one or more oxide materials have a G-value for hydrogen from alpha hydrolysis that is approximately 0.01 to approximately 1.6, approximately 0.05 to approximately 1.5, approximately 0.1 to approximately 1.4, or approximately 0.25 to approximately 1.3.

In some embodiments, the oxide material has a G-value for hydrogen from beta and/or gamma radiolysis that is less than that of pure water—i.e., less than 0.45. In another embodiment, the one or more oxide materials have a G-value for hydrogen from beta and/or gamma radiolysis that is no more than approximately 0.4, no more than approximately 0.35, no more than approximately 0.3, no more than approximately 0.25, or no more than approximately 0.20. In another embodiment, the one or more oxide materials have a G-value for hydrogen from beta and/or gamma hydrolysis that is approximately 0.001 to approximately 0.45, approximately 0.01 to approximately 0.4, approximately 0.05 to approximately 0.35, or approximately 0.1 to approximately 0.3.

Examples of suitable oxide materials include $MnO_2$, $CrO_3$, CuO, and ZnO. In some embodiments, the oxide material is capable of supplying oxygen that reacts with the hydrogen to form water and prevent the formation of hydrogen gas. Examples of such materials include $MnO_2$, $CrO_3$.

The oxide material can be added to interior of the ion exchange column 3 in any suitable manner. The oxide material can be mixed with the ion exchange media 5 to form a roughly homogeneous mixture or it can be added in a manner that does not produce a homogeneous mixture. Preferably, the oxide material is well mixed with the ion exchange media 5 so that radiation emitting radionuclides captured on the media are more likely to interact with the oxide material. In some embodiments, the oxide material is not capable of exchanging ions with the liquid waste stream and is, in this respect, considered inert.

Illustrative Embodiments

Reference is made in the following to a number of illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all of the possible embodiments.

In one embodiment, an ion exchange system comprises: an ion exchange column including a housing and ion exchange media positioned inside the housing; an oxide material positioned inside the housing, the oxide material having a G-value for hydrogen from beta and gamma radiolysis that is no more than 0.45; and a hydrogen scavenging material and/or a hydrogen catalytic material positioned inside the housing.

The ion exchange media can be positioned in a first chamber and the hydrogen scavenging material and/or the hydrogen catalytic material can be positioned in a second chamber that is separate from the first chamber. The ion exchange system can comprise a sealing device that moves between a closed position where the first chamber is not in fluid communication with the second chamber and an open position where the first chamber is in fluid communication with the second chamber.

In another embodiment, an ion exchange system comprises: an ion exchange column including a housing and ion exchange media positioned inside the housing; and a hydrogen scavenging material positioned inside the housing, the hydrogen scavenging material being capable of removing hydrogen gas from the inside of the housing. The hydrogen scavenging material can irreversibly remove hydrogen gas from inside the housing. The hydrogen scavenging material can be a solid.

The hydrogen scavenging material can absorb and/or adsorb hydrogen gas inside the housing. The hydrogen scavenging material can chemically and/or physically bond with hydrogen gas inside the housing. The hydrogen scavenging material can include 1,4-bis(phenylethynyl)benzene. The ion exchange media can be loaded with one or more radionuclides.

In another embodiment, an ion exchange system comprises: an ion exchange column including a housing and ion exchange media positioned inside the housing; and a hydrogen catalytic material positioned inside the housing, the hydrogen catalytic material being capable of catalyzing the reaction of hydrogen and oxygen and reducing the amount of hydrogen gas inside the housing. The hydrogen catalytic material can include PdO. The ion exchange media can be loaded with one or more radionuclides.

In another embodiment, an ion exchange system comprises: an ion exchange column including a housing and ion exchange media positioned inside the housing; and an oxide material positioned inside the housing, the oxide material having a G-value for hydrogen from beta and gamma radiolysis that is no more than 0.45. The oxide material can be mixed with the ion exchange media.

The oxide material can have a G-value for hydrogen from beta and gamma radiolysis that is no more than 0.4. The oxide material can have a G-value for alpha radiolysis that is no more than 1.6. The oxide material can have a G-value for alpha radiolysis that is no more than 1.5. The oxide material can be capable of supplying oxygen that reacts with the hydrogen and reduces the amount of hydrogen gas inside the housing. The oxide material can include $MnO_2$, $CrO_3$, CuO, and/or ZnO.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The invention claimed is:

1. An ion exchange system comprising:
    an ion exchange column including a housing and ion exchange media positioned inside the housing;
    an enclosure positioned inside the housing; and
    a hydrogen scavenging material positioned inside the enclosure, the hydrogen scavenging material being capable of removing hydrogen gas from the inside of the housing;
    wherein the enclosure includes a sealing device moveable between a closed position where the hydrogen scavenging material is not in fluid communication with the ion exchange media and an open position where the hydrogen scavenging material is in fluid communication with the ion exchange media.

2. The ion exchange system of claim 1 wherein the hydrogen scavenging material irreversibly removes hydrogen gas from inside the housing.

3. The ion exchange system of claim 1 wherein the hydrogen scavenging material is a solid.

4. The ion exchange system of claim 1 wherein the hydrogen scavenging material absorbs and/or adsorbs hydrogen gas inside the housing.

5. The ion exchange system of claim 1 wherein the hydrogen scavenging material chemically and/or physically bonds with hydrogen gas inside the housing.

6. The ion exchange system of claim 1 wherein the hydrogen scavenging material includes 1,4-bis(phenylethynyl)benzene.

7. The ion exchange system of claim 1 wherein the ion exchange media is loaded with one or more radionuclides.

8. An ion exchange system comprising:
    an ion exchange column including a housing and ion exchange media positioned inside the housing;
    an enclosure positioned inside the housing; and
    a hydrogen catalytic material positioned inside the enclosure, the hydrogen catalytic material being capable of catalyzing the reaction of hydrogen and oxygen and reducing the amount of hydrogen gas inside the housing;
    wherein the enclosure includes a sealing device moveable between a closed position where the hydrogen catalytic material is not in fluid communication with the ion exchange media and an open position where the hydrogen catalytic material is in fluid communication with the ion exchange media.

9. The ion exchange system of claim 8 wherein the hydrogen catalytic material includes PdO.

10. The ion exchange system of claim 8 wherein the ion exchange media is loaded with one or more radionuclides.

11. An ion exchange system comprising:
    an ion exchange column including a housing and ion exchange media positioned inside the housing; and
    an oxide material positioned inside the housing, the oxide material having a G-value for hydrogen from beta and gamma radiolysis that is no more than 0.45;
    wherein the oxide material is mixed with the ion exchange media.

12. The ion exchange system of claim 11 comprising:
    a hydrogen scavenging material and/or a hydrogen catalytic material positioned inside the housing.

13. The ion exchange system of claim 1 wherein the ion exchange media is positioned in a first chamber and the hydrogen scavenging material and/or the hydrogen catalytic material are positioned in a second chamber that is separate from the first chamber.

14. The ion exchange system of claim 13 comprising a sealing device that moves between a closed position where the first chamber is not in fluid communication with the second chamber and an open position where the first chamber is in fluid communication with the second chamber.

15. The ion exchange system of claim 11 wherein the oxide material has a G-value for hydrogen from beta and gamma radiolysis that is no more than approximately 0.4.

16. The ion exchange system of claim 11 wherein the oxide material has a G-value for alpha radiolysis that is no more than 1.6.

17. The ion exchange system of claim 11 wherein the oxide material has a G-value for alpha radiolysis that is no more than approximately 1.5.

18. The ion exchange system of claim 11 wherein the oxide material is capable of supplying oxygen that reacts with the hydrogen and reduces the amount of hydrogen gas inside the housing.

19. The ion exchange system of claim 11 wherein the oxide material includes $MnO_2$, $CrO_3$, CuO, and/or ZnO.

* * * * *